Patented May 25, 1943

2,320,217

UNITED STATES PATENT OFFICE 2,320,217

KETONIC POLYCARBOXYLIC ACIDS

Herman A. Bruson, Philadelphia, Pa., assignor to The Resinous Products & Chemical Company, Philadelphia, Pa., a corporation of Delaware No Drawing. Application October 11, 1941, Serial No. 414,599

8 Claims. (Cl. 260—515)

This invention relates to arylaliphatic ketones having at least two β-carboxy-ethyl radicals on a carbon atom contiguous to the carbonyl group.

These polycarboxylic acids are new compounds which are useful in the preparation of resins of the alkyd or nylon type. In the form of their esters they are useful as plasticizers for cellulose esters, cellulose ethers, as well as other resinous plastics.

According to this invention, arlaliphatic ketones having at least two β-carboxy-ethyl radicals on a carbon atom adjacent the carbonyl group are prepared by hydrolyzing the reaction products obtained by condensing an arylaliphatic ketone having an active methylene or methyl group contiguous to its carbonyl group in the presence of alkaline condensing agents with at least two molecular equivalents of acrylonitrile.

The preparation of the said reaction products is described in copending application Serial No. 399,504, filed June 24, 1941, now Patent No. 2,287,510 of which this application is a continuation-in-part.

According to the method disclosed therein, an arylaliphatic ketone having an active methylene or methyl group contiguous to the carbonyl group is reacted in the presence of an alkaline condensing agent with at least two molecular equivalents of acrylonitrile to form a poly-β-cyanoethyl derivative of the ketone by replacement of the hydrogen atoms of the active methylene or methyl group by —CH$_2$CH$_2$CN radicals.

The reaction with acrylonitrile is applicable to a wide variety of monocyclic or polycyclic arylaliphatic ketones including saturated or unsaturated monoketones or polyketones. The ketones may contain other nuclear substituents of an inert character which do not destroy the alkaline condensing agent used. For example, these groups may be halogen, acyl, alkoxy, aryloxy, thioether, tertiary amino, sulfonyl, carbalkoxy, carbamyl, cyano, thiocyano, alkyl, aryl, aralkyl, or cycloalkyl, etc.

Typical arylaliphatic ketones which are more readily available for the purpose of this invention include, for example, acetophenone, and propiophenone, butyrophenone, valerophenone, laurophenone, stearophenone, dibenzyl ketone, dibenzoyl-butane-1,4, desoxybenzoin, p-acetyl diphenyl, β-acetyl naphthalene, 5-acetyl acenaphthene, 3-acetyl phenanthrene, p-methyl acetophenone, p-benzyl acetophenone, p-cyclohexyl acetophenone, p-chloroacetophenone, p-bromoacetophenone, p-methoxy acetophenone, and their homologues.

Among the alkaline condensing agents which are effective for promoting the reaction between arylaliphatic ketone and acrylonitrile are the oxides, hydroxides, hydrides, amides, and alcoholates of the alkali metals, or the alkali metals themselves. There may also be used strongly basic non-metallic hydroxides such as the quaternary ammonium hydroxides. Of these, a particularly effective condensing agent is the aqueous solution containing 40% of trimethyl benzyl ammonium hydroxide, which is commercially available under the trade name "Triton B." The quantity of condensing agent required is relatively small, amounts of the order of 1% to 10% on the combined weight of the reactants usually being sufficient. One or several of these alkaline materials are suspended or, preferably, dissolved in the reactive arylaliphatic ketone itself or in a solution thereof in an inert liquid such as dioxane, ether, benzene, or in a liquid which is less reactive than the reacting components, such as water or tertiary butyl alcohol. The condensation takes place readily at temperatures from about 0° to about 80° C., although initial temperatures of 25° C. to about 45° C. are preferred. The condensation is usually exothermal so that cooling, at least during the initial part of the reaction, is generally advantageous in order to control the vigor of the reaction and to prevent undesired polymerization or side reactions. After the reaction is completed, the condensation product may be isolated and purified or it may be utilized in crude form for the hydrolysis.

Hydrolysis is carried out by heating the condensation product with water in the presence of a hydrolytic agent until ammonia has been eliminated. For this purpose there may be used a solution of an alkali such as sodium hydroxide or potassium hydroxide or of an aqueous non-oxidizing mineral acid such as hydrochloric or sulfuric acid. The alkalies, however, are preferred since there is less tendency for lactone formation. Temperatures at about 100–110° C. are generally suitable, but higher temperatures may be used when the hydrolysis is performed under pressure.

The following examples illustrate this invention:

*Example 1*

A mixture consisting of 400 cc. of water, 39 g. of potassium hydroxide and 55.8 g. of the tricyanoethylation product of acetophenone melting at 128–129° C. (obtained by condensing acetophenone with three mols of acrylonitrile in the presence of 1% by weight of "Triton B") was stirred rapidly and boiled under reflux for four hours. The cooled solution was acidified with concentrated hydrochloric acid and the white, partially resinous, crystalline precipitate purified by recrystallization from hot water. The product separated in colorless crystals melting at 142–145° C., with decomposition, having the formula:

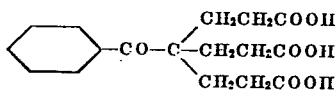

The yield was 58 g.

*Example 2*

A mixture consisting of 100 g. of water, 12 g. of sodium hydroxide, and 18.5 g. of the tricyanoethylation product of p-methyl-acetophenone melting at 161–162° C. (obtained by condensing p-methyl-acetophenone with three mols of acrylonitrile in the presence of 1% by weight of "Triton B") was boiled under reflux for six hours. The clear solution was treated with charcoal, filtered, and acidified with hydrochloric acid. The product precipitated as a soft, resinous mass which rapidly solidified to a white, crystalline solid. Upon recrystallization from boiling water in which it is only slightly soluble, it separated in fine, colorless crystals, M. P. 226° C., having the formula:

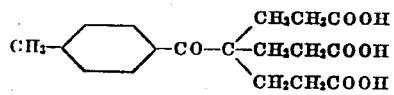

*Example 3*

A mixture consisting of 200 g. of water, 8 g. of sodium hydroxide, and 17 g. of the tricyanoethylation product of p-acetyldiphenyl melting at 178° C. was boiled under reflux for 12 hours. The clear, filtered solution, after being bleached with charcoal, was acidified with concentrated hydrochloric acid. The product precipitated as a soft mass which, after being washed with hot water, solidified in a yield of 20.5 g. Upon recrystallization from dioxane-water mixture (25–75) which was treated with charcoal, the product formed colorless crystals, M. P. 236–238° C., having the formula:

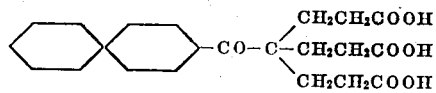

*Example 4*

A mixture consisting of 50 g. of water, 4 g. of sodium hydroxide, and 6 g. of the tricyanoethylation product of p-methoxyacetophenone melting at 133° C. (obtained by condensing p-methoxyacetophenone with three mols of acrylonitrile in the presence of "Triton B") was boiled under reflux for six hours, bleached with charcoal, and then filtered. The filtrate was acidified with hydrochloric acid and the taffy-like precipitate allowed to solidify. Upon recrystallization from 800 g. of boiling water, the product, weighing six grams, separated in colorless, flaky crystals, M. P. 219° C., having the formula:

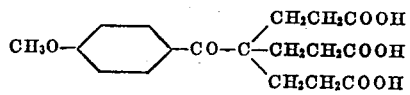

*Example 5*

A mixture of 200 g. of water, 13 g. of sodium hydroxide, and 23 g. of the tricyanoethylation product of p-cholor-acetophenone melting at 141–142° C. (obtained by condensing p-chloro-acetophenone with three mols of acrylonitrile in the presence of 1% by weight of "Triton B") was boiled under reflux for seven hours. The clear solution obtained was bleached with charcoal, filtered, and acidified with hydrochloric acid. The precipitate formed a soft mass which soon solidified, giving a yield of 25 g. Upon recrystallization from a large volume of boiling water, it separated in fine, colorless flake-like crystals, M. P. 225–227° C., having the formula:

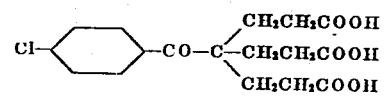

*Example 6*

A mixture of 200 g. of water, 12 g. of sodium hydroxide, and 23 g. of the tricyanoethylation product of p-bromo-acetophenone melting at 151–152° C. (obtained by condensing p-bromo-acetophenone with three mols of acrylonitrile in the presence of 1% by weight of "Triton B") was boiled under reflux for five hours and worked up as in Example 5. The product (22 g.) upon crystallization from dioxane-water mixture (25–75) formed colorless crystals, M. P. 241–243° C., having the formula:

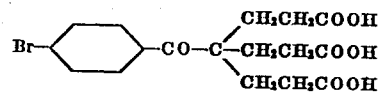

*Example 7*

A mixture of 150 g. of water, 10 g. of sodium hydroxide, and 14 g. of the tricyanoethylation product of 2-acetyl naphthalene melting at 122° C. (obtained by condensing 2-acetyl naphthalene with three mols of acrylonitrile in the presence of 1% by weight of "Triton B") was boiled eight hours under reflux and worked up as in Example 5. The product, upon recrystallization from dioxane-water mixture (25–75), formed colorless crystals, M. P. 173–174° C., having the formula

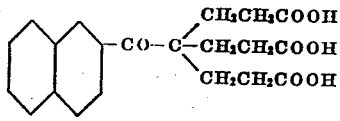

*Example 8*

A mixture of 150 g. of water, 6 grams of sodium hydroxide, and 12 g. of the dicyanoethylation product of desoxybenzoin, M. P. 149–150° C. (obtained by condensing desoxybenzoin with two mols of acrylonitrile in the presence of "Triton B") and boiled under reflux for 24 hours. The dark solution was clarified with charcoal, filtered, and acidified with hydrochloric acid. The white crystalline solid obtained melted at 172–173° C. after recrystallization from water, and had the formula:

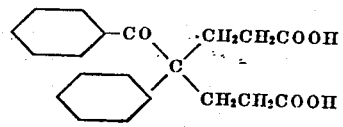

*Example 9*

A mixture of 150 g. of water, 10 g. of sodium hydroxide, and 16.5 g. of the dicyanoethylation product of propiophenone, melting at 66° C., (obtained by condensing propiophenone with two mol equivalents of acrylonitrile in the presence of "Triton B") was boiled under reflux for 6½ hours and worked up as in Example 5. The product crystallized from hot water in colorless prisms, M. P. 166–167° C., having the formula:

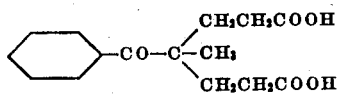

I claim:

1. As a new compound, an arylaliphatic ketone having a plurality of —CH₂CH₂COOH radicals on an aliphatic carbon atom contiguous to the carbonyl group.

2. As a new compound, an arylaliphatic ketone having three —CH₂CH₂COOH radicals on an aliphatic carbon atom contiguous to the carbonyl group.

3. As a new compound, an arylaliphatic ketone having two —CH₂CH₂COOH radicals on an aliphatic carbon atom contiguous to the carbonyl group.

4. As a new compound, tri-(β-carboxy ethyl)-acetophenone having the formula:

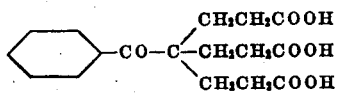

5. As a new compound, tri-(β-carboxy ethyl)-p-methyl-acetophenone having the formula:

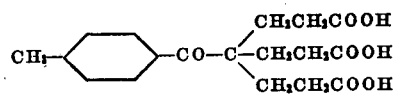

6. As a new compound, tri-(β-carboxy ethyl)-p-chloro-acetophenone having the formula:

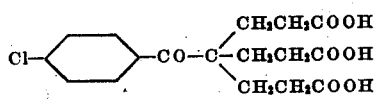

7. A method for preparing an arylaliphatic ketone having a plurality of —CH₂CH₂COOH radicals on an aliphatic carbon atom contiguous to the carbonyl group, which comprises hydrolyzing an arylaliphatic ketone having at least two β-cyanoethyl groups attached to the aliphatic carbon atom contiguous to the carbonyl group.

8. A method for preparing an arylaliphatic ketone having a plurality of —CH₂CH₂COOH radicals on an aliphatic carbon atom contiguous to the carbonyl group, which comprises hydrolyzing by means of aqueous alkali metal hydroxide solution an arylaliphatic ketone having at least two β-cyanoethyl groups attached to the aliphatic carbon atom contiguous to the carbonyl group.

HERMAN A. BRUSON.